United States Patent [19]

Takizawa

[11] 4,261,106
[45] Apr. 14, 1981

[54] METHOD OF MANUFACTURING A LINEAR DIGITAL SCALE

[75] Inventor: Kinji Takizawa, Utsunomiya, Japan

[73] Assignee: Mitutoyo Mfg. Co., Ltd., Tokyo, Japan

[21] Appl. No.: 44,043

[22] Filed: May 31, 1979

[30] Foreign Application Priority Data

Jun. 9, 1978 [JP] Japan .................................. 53-70190

[51] Int. Cl.³ ............................................ G01B 11/04
[52] U.S. Cl. ................................................. 33/125 R
[58] Field of Search ................. 33/125 R, 125 C, 483, 33/488, 493, 494, 1 L

[56] References Cited

U.S. PATENT DOCUMENTS

| 2,313,920 | 3/1943 | Campbell | 33/484 |
| 4,160,328 | 7/1979 | Ernst | 33/125 R |

FOREIGN PATENT DOCUMENTS

| 1233612 | 2/1967 | Fed. Rep. of Germany | 33/494 |
| 899212 | 6/1962 | United Kingdom | 33/494 |
| 1192513 | 5/1970 | United Kingdom | 33/125 C |

Primary Examiner—Harry N. Haroian

[57] ABSTRACT

A linear digital scale including an extended linear digital scale made up with a plurality of relatively small digital scale pieces which are connected and fixed together, and its manufacturing method in which graduation coincidence by use of a standard scale removes the errors produced at bound and fixed sections.

4 Claims, 6 Drawing Figures

METHOD OF MANUFACTURING A LINEAR DIGITAL SCALE

BACKGROUND OF THE INVENTION

1. Field of Invention

This invention relates to a linear digital scale and a method of manufacturing the linear digital scale, and in particular to an extended digital scale which utilizes an optical reading system and its manufacturing method.

2. Description of the Prior Art

There has been a well-known measuring instrument which can digitally display the length of measured object or coordinate positions of measured points by the use of a digital scale, the moving part of which is slid corresponding to the measured object. The digital display type measuring instrument finds particular utility in a length measuring machine or a three dimensional coordinate measuring machine. As for the digital display type scale, a digital scale having an optical reading system is of wide use due to the fact that it provides the output signal for digital measuring with high accuracy and reliability. Ordinarily, the optical reading type digital scale has a plurality of slits regularly arranged at equal spaces on the surface of a long and thin glass scale. When the scale is moved corresponding to the length of a measured object, the passing numbers of slits are photo-electrically counted to show the length on a digital display by detecting the counted value.

The afore-mentioned digital scale is suitable for the accurate measurement with inconsiderable reading error but it is difficult to arrange the slits on the scale surface with high accuracy. In particular it is extremely difficult to obtain a long scale.

SUMMARY OF THE INVENTION

Accordingly, the general objects of the present invention are to provide a extended linear digital scale by connecting a plurality of small scale pieces one after another, and to provide a manufacturing method for the extended digital scale.

In keeping with the principles of the present invention, the objects are accomplished with a unique extended linear digital scale by coupling and fixing together a plurality of small digital scale pieces. In order to couple and fix plural small scale pieces, a standard scale having the standard slits arranged at the same distance with the slits of the digital scale is utilized. After the end portion of one small digital scale piece is laid on a part of the standard scale and the slits of the small scale piece is coincidently overlapped on the slits of the standard scale, the end of the other small digital scale piece is laid on the rest of the standard scale and the slits of the latter small scale piece are overlapped on the standard slits of the rest of the standard scale. In such a state, both small digital scale pieces are fixed to each other and a plurality of small digital scale pieces can be connected and coupled together to compose an extended scale.

In the present invention the connection and coupling may be accomplished by a reinforcing board fixing the one side of the scale pieces, or each scale piece may be directly bound and fixed at both facing ends.

The bound and fixed section of the digital scale can be utilized as one of the measuring slits utilizing the light shield properties thereof, and the adjustment of the thickness at a binding and fixing layer can perform the adjustment of graduations of both digital scale pieces.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
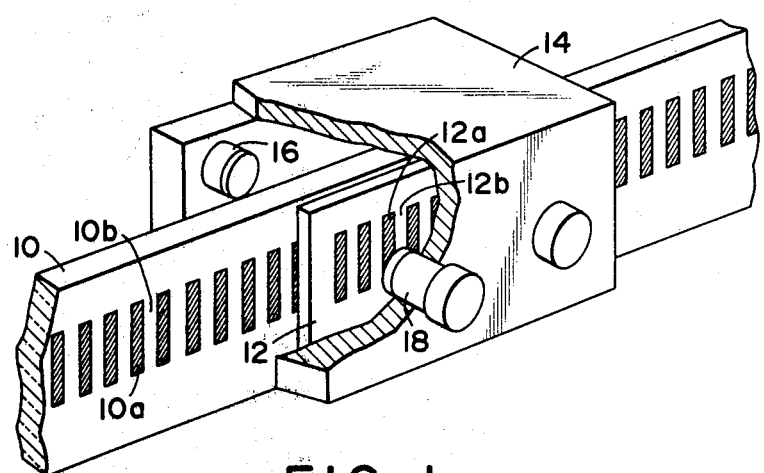
FIG. 1 is a perspective view showing the structure of a linear digital scale.

Referring more particularly to the drawings, shown in FIG. 1 is a general optical reading type digital scale including a main scale 10 mounted on a base which is not illustrated. In the vicinity of the main scale 10, an index scale 12, which is attached to a slider 14, is slidably arranged along the main scale 10 with the slider 14. Toward the one side of the main scale 10 a light emitter consisting of luminescent diode 16 is mounted on the slider 14, and toward the other side of the main scale 10 a light receiver consisting of photo-transistor 18 is firmly mounted on the slider 14 over the index scale 12. On the surfaces of the main scale 10 and some index scale 12 are arranged light shield sections 10a and 12a by etching or other means, at equal intervals so that slits 10b and 12b which can transmit light are formed at equal distances among the light shield sections. In FIG. 1, the widths of light shield sections 10a and 12a and the light transmitting slits 10b and 12b are respectively provided to be ten micrometers.

The digital scale shown in FIG. 1 is composed as mentioned in the above. During the movement of the slider 14 along the main scale 10 corresponding to the length of measured object or the position of measured points, a relative displacement between the main scale 10 and the index scale 12 is photo-electrically converted to a digital signal by the light emitter 16 and the light receiver 18.

Figure 2:
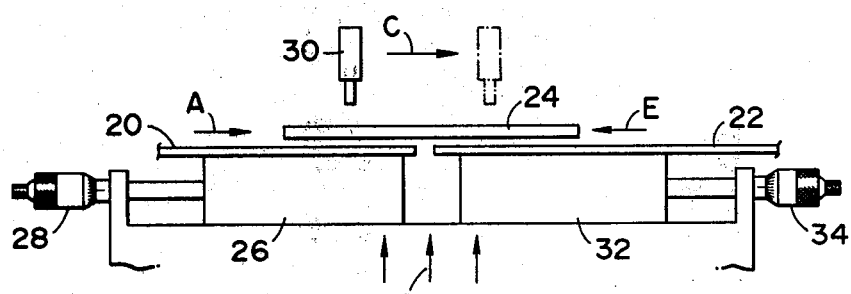
FIG. 2 is a schematic illustration showing a manufacturing method of the digital scale in accordance with the teachings of the present invention.

Referring to FIG. 2, shown therein is a manufacturing method of the digital scale in accordance with the teachings of the present invention. One digital scale piece 20 is connected to and coupled with another digital scale piece 22.

In FIG. 2, a standard scale 24 is mounted on a fixed base, which is not illustrated, and one digital scale piece 20 is set up on a first moving base 26 so that it can be precisely moved toward an arrow A. On the side of the first moving base 26 is attached a micrometer type precisional transfer instrument 28. By operation of the transfer instrument, one digital scale piece 20 is moved toward the arrow A in order to be arranged in overlap with the standard scale 24.

Figure 3:
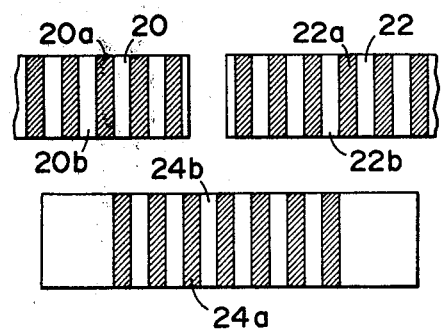
FIG. 3 is an illustration of disposition showing the relation between a digital scale pieces and a standard scale in FIG. 2.

Shown in FIG. 3 is a plan view of the standard scale 24 and the digital scale pieces 20 and 22, and on the surface of each scale are arranged the slits 20b, 22b and 24b divided by light shield sections 20a, 22a and 24a. A microscope 30 is installed above the standard scale 24. The operator checks a coincidently overlapping state between the standard slit 24b on the standard scale 24 and the slit 20b on the digital scale piece 20 by the light B irradiated under the moving base 26. The operator stops moving the transfer instrument 28 to cramp the first digital scale 20 in the overlapping state of both slits 20b and 24b. The first digital scale piece 20 covers over the approximate half of standard scale 24 in this overlapping state, and the other digital scale 22 is laid over the rest half of the standard scale 24 in the same way as the digital scale piece 20 is placed. In another words, after the first digital scale piece 20 is clamped, the other digital scale piece 22 is moved under the standard scale 24 by a second moving base 32. On the side of the moving base 32 also is attached a micrometer type precisional transfer instrument 34 which moves the second digital scale piece 22 precisely. While the second digital scale piece 22 is being transferred, the microscope 30 can be moved to the chain line position as shown by an arrow C, and the operator checks the overlapping state between the slit 22b of the second digital scale piece 22 and the standard slit 24b of the standard scale 24 when the second digital scale piece 22 is moved in the direction of an arrow E.

When the graduation of the second digital scale piece 22 overlaps the standard scale 24, both digital scale pieces 20 and 22 are connected and fixed to compose a coupled digital scale.

In order to accomplish an accurate alignment of the both digital scale pieces 20 and 22 at equal spaces of their slits 20b and 22b, it is preferable to arrange each slit and each light shield section of the digital scale pieces 20 and 22 in the same width as shown in FIGS. 2 and 3. If the light shield sections 20a and 22a of the digital scale pieces 20 and 22 are exactly overlapped on the standard slit 24b of the standard scale 24, the irradiated light B does not transmit through and cannot be seen through the microscope 30 shielded by the aligned light shield sections 20a, 22a and 24a, leaving no space between them. In this coincided positioning, in which the slits 20b and 22b can be aligned at equal spaces, the digital scale pieces 20 and 22 can be firmly fixed together.

In the illustrated embodiment there is used an eye checking for the accomplishment of accurate alignment in digital scale pieces by the microscope 30, but it is possible to use a photo-electric converter to coincide the graduations electrically, and further, it is possible to control the moving rate of the transfer instruments 28 and 34 by the electrically detected signal to operate an automatic coincidence of the graduations.

Figure 4:
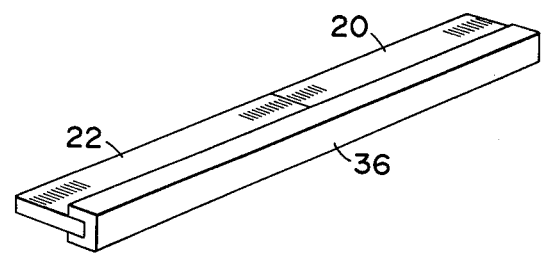
FIG. 4 is a perspective view of a digital scale manufactured through the method shown in FIG. 2.

In FIG. 4, shown therein is a state in which both digital scale pieces 20 and 22 are connected and fixed by a reinforcing board 36 which is attached along the side of both digital scale pieces 20 and 22 so as not to interfere with a slit area. The reinforcing board 36 is made of metal or plastic and is stuck and fixed to both digital scale pieces 20 and 22. According to the coupling and fixing method shown in FIG. 4, both digital scale pieces 20 and 22 do not have s sticking section on their coupling faces, and optical properties in this area can be kept in good condition. Accordingly, such a construction can eliminate the occurrence of count pulse detection errors in a digital signal detector cooperating with the digital scale, since the coupling faces are arranged to exist about the middle of slits and the non-stick layer coupling in FIG. 4 can keep the light transmitting quality at coupling section in good condition.

In the illustrated non-stick layer coupling, it would be better to provide an air gap between both digital scale pieces 20 and 22, the structure of which can allow some manufacturing error in cutting both digital scale pieces. In other words, establishment of the slit thickness on both coupling ends smaller than the slit distance can prevent a collision at both ends of digital scale pieces in graduation coincidence.

Figure 5:
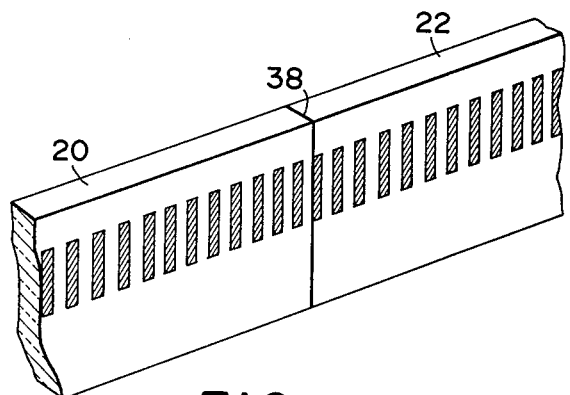
FIG. 5 is a perspective view showing another embodiment of the digial scale manufactured through the method in accordance with the teachings of the present invention.

Referring to FIG. 5, shown therein is another embodiment of the digital scale manufactured in accordance with the teachings of the present invention. This embodiment is characterized in direct sticking at both ends of digital scale pieces. On the one sticking end of each digital scale 20 or 22, a heat hardening binding agent such as epoxy resin is painted beforehand. After one digital scale piece 20 is clamped, the other digital scale piece 22 is moved in the direction of the arrow E by the transfer instrument 34 as shown in FIG. 2, and the binding agent makes up a binding layer on the both ends of the digital scale pieces 20 and 22 to couple and fix both pieces firmly together, when the digital scale pieces 20 and 22 and their graduations coincide. The thickness of the binding agent is established at a few micrometers, but the adjustment of the thickness of binding layer in binding and fixing makes it possible to regulate the graduations of both digital scale pieces. In other words, there is an error on the ends of the digital scale pieces when they are cut off; but the adjustment of the thickness of binding layer could absorb this error, and the graduation error is not produced. Since the binding portion shown in FIG. 5 has small binding area and is weak in fixing power, it is favorable to use the reinforcing board 36 shown in FIG. 4 or to use a shorter reinforcing board covering along the side of binding section when necessary.

Figure 6:
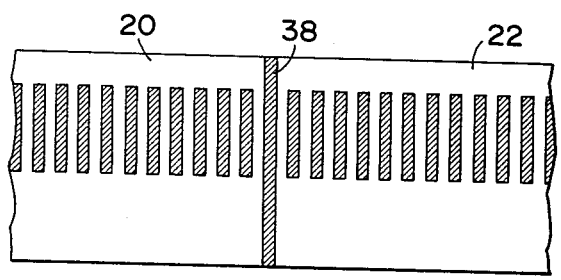
FIG. 6 is a plan view showing the other embodiment of the digital scale manufactured through the method in accordance with the teachings of the present invention.

In FIG. 6, shown therein is the other embodiment of the digital scale manufactured in accordance with the teachings of the present invention, and this embodiment has such characteristics that the binding layer forms up one of the graduation slit. In case of coupling and fixing two digital scale pieces by a binding agent, an irregular pulse is produced in the binding layer to cause in miscounting, since there is a difference in optical properties between the binding layer and the scale. In the embodiment shown in FIG. 6, on the contrary to drawbacks mentioned in the above, utilization of the non-transparent properties in the binding layer 38 can prevent the production of miscounting at the binding layer since the binding layer can consist in a light shield section which forms up the slit. Being cut into pieces, the digital scale pieces 20 and 22 are ground at the bound ends by rubbing until the light shield sections are removed, and the binding layer 38 is inserted and arranged as a light shield section for a graduation when the pieces are coupled. It is also preferred to color the binding agent black depending on the optical property of the binding layer 38.

As described hereinabove, the present invention provides a linear digital scale with arbitrary length made by coupling plural relatively small digital scale pieces which are easily manufactured. Furthermore, the overlapping of the positions of the graduations to the standard scale can remove the error produced in the coupling place. Thus, the present invention has the advantage of obtaining a long linear digital scale usable in various fields at extremely low cost.

In all cases, it is understood that the above described embodiments are merely illustrative of but a few of the many possible specific embodiments which represent the applications of the principles of the present invention. Numerous and varied other arrangements can be readily devised in accordance with these principles by those skilled in the art without departing from the spirit and scope of the invention.

I claim:

1. A method of manufacturing a long, linear digital scale comprising the steps of:
   placing at least two linear scale pieces longitudinally with one end of each of said two linear scale pieces adjacent to each other on a flat surface;
   providing a linear scale superposed to said two linear scale pieces and overlapping said two adjacent ends of said linear scale pieces;
   moving one of said linear scale pieces longitudinally until scale graduations on said one linear scale piece coincide with scale graduations on said superposed linear scale;
   moving another of said two linear scale pieces longitudinally until scale graduations on said another linear scale piece coincide with said scale graduations on said superposed linear scale; and
   permanently fixing said two linear scale pieces together.

2. A method of manufacturing a long, linear digital scale according to claim 1 wherein said linear scale pieces are moved utilizing a micrometer type precision transfer instrument.

3. A method of manufacturing a long, linear digital scale according to claims 1 or 2 wherein said two linear scale pieces are fixed together utilizing a binding agent.

4. A method of manufacturing a long, linear digital scale according to claims 1 or 2 wherein said two linear scale pieces are fixed together utilizing a reinforcing board along at least one side of said linear scale pieces.

* * * * *